May 26, 1925.  
W. S. SEARLES  
OPHTHALMIC MOUNTING  
Filed Aug. 22, 1922
1,539,147
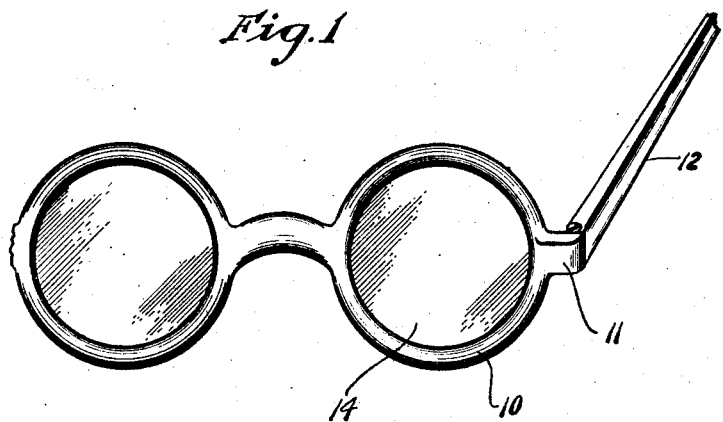
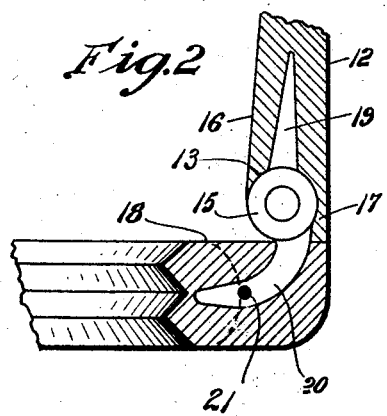
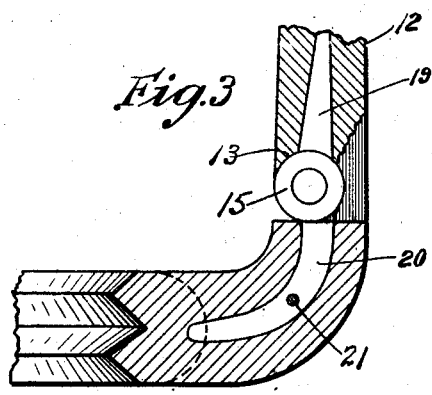
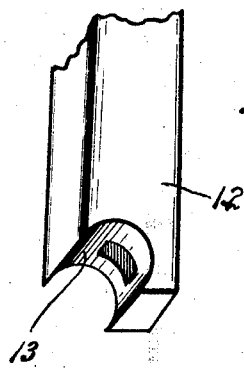
Inventor  
Wayne S. Searles  
By Howard E. Barlow  
Attorney Patented May 26, 1925.

1,539,147

UNITED STATES PATENT OFFICE.

WAYNE S. SEARLES, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND.

OPHTHALMIC MOUNTING.

Application filed August 22, 1922. Serial No. 583,465.

*To all whom it may concern:*

Be it known that I, WAYNE S. SEARLES, a citizen of the United States, residing at Providence, in the county of Providence and State of Rhode Island, have invented certain new and useful Improvements in Ophthalmic Mountings, of which the following is a specification.

This invention relates to improvements in the construction of ophthalmic mountings, and has for its object to provide an improved construction of the parts at the joint where the temple is hinged to the frame, which is that of providing a transverse groove in the end of the temple, of a depth substantially the diameter of the body of the hinge, into which the hinge body is set without grooving the face of the end piece of the frame.

A further object of the invention is to insert a pin transversely through the end piece and also through the arm of the hinge joint which is imbedded into the end piece, to lock the arm in the end piece.

With these and other objects in view, the invention consists of certain novel features of construction, as will be more fully described, and particularly pointed out in the appended claims.

In the accompanying drawings:

Figure 1 is a perspective view showing the non-metallic spectacle frame in which my improved temple joint is employed.

Figure 2 is an enlarged sectional view of the temple joint showing the end of the temple as grooved to receive the body of the joint member, the side faces of the end piece being in line with the side edges of the frame.

Figure 3 shows my improved construction of joint as applied to an end piece that is bent or arranged to extend rearwardly.

Figure 4 is a perspective view showing the transverse recess in the joint end of the temple.

It is found in practice desirous in the construction of non-metallic spectacle frames of this character, to form a transverse groove in the joint end of the temple of sufficient depth to receive the entire body portion of the hinge member without being obliged to also groove the hinge face of the end piece as this construction reduces the cost of manufacture and provides a very strong and durable structure, and the following is a detailed description of one means by which these results may be accomplished.

With reference to the drawings, 10 designates the usual spectacle frame which is formed either wholly or in part of non-metallic material such as celluloid, zylonite, shell or other suitable material, the opposite ends of the frame being provided with end pieces 11 to which the temples 12 are hinged.

In constructing the hinge end of the temple, I preferably provide a transverse groove 13 through this end portion of the temple, the same being preferably parallel with the plane of the lenses 14 and this groove is preferably offset inwardly from the longitudinal axis of the temple so that the periphery of the body portion 15 of the hinge, is substantially tangent to the inner edge 16 of the temple whereby the outer edge of the temple is provided with a forwardly-extending portion 17 at this end arranged to engage the adjacent face 18 of the end piece to serve as a stop to limit the opening swing of the temple.

Each of the members of the body portion of the hinge is preferably provided with an arm or spur, arm 19 being arranged to extend into the end of the temple while arm 20 on the other member of the hinge is shown as being curved to extend into the end piece of the frame.

In some instances it is found of advantage to lock the arm 20 in the end piece by passing a pin or rivet 21 transversely through the end piece and also through the arm whereby this arm is positively prevented from working loose in the end piece.

My improved construction of mounting is extremely simple and inexpensive to manufacture and has practical advantages over the structure wherein the body of the hinge is set part way into the end piece and part into the end of the temple.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In an ophthalmic mounting, a lens frame having an end piece with an ungrooved hinged face, a hinge having a body member, a temple joined by said hinge to said face and provided at its joint end with a transverse groove of a depth substantially the diameter of the hinge-body to receive the same, and arms on the members of the hinge-body extending into the end piece and the temple respectively.

2. In an ophthalmic mounting, a lens frame having an end piece with an ungrooved hinged face, a hinge having a body member, a temple member joined by said hinge to said face and provided at its hinged end with a transverse groove of a depth substantially the diameter of the hinge-body to receive the same, the outer edge of said temple serving as a stop to limit the opening swing of the temple, and arms in the body member extending into the end piece and temple respectively.

3. In an ophthalmic mounting, a lens frame having an end piece with an ungrooved hinged face, a hinge, a temple member joined thereby to said face and provided at its hinged end with a transverse groove of a depth substantially the diameter of the hinge-body to receive the same, said groove in said temple being offset inwardly from the longitudinal axis of said temple and its outer edge serving as a stop to limit its opening swing.

4. In an ophthalmic mounting, a lens frame having an end piece with an ungrooved hinged face, a hinge having a body member, a temple joined by said hinge to said face and provided at its joint end with a transverse groove of a depth substantially the diameter of the hinge-body to receive the same, arms on the members of the hinge-body extending into the end piece and the temple respectively; and a transverse pin through the end piece and arm for locking the arm thereon.

In testimony whereof I affix my signature.

WAYNE S. SEARLES.